Dec. 1, 1959 R. R. WALTON 2,915,109
CONDENSING TRAVELING SHEET MATERIALS
Filed May 7, 1957 8 Sheets-Sheet 1

Inventor,
Richard R. Walton,
by *[signature]*
Atty.

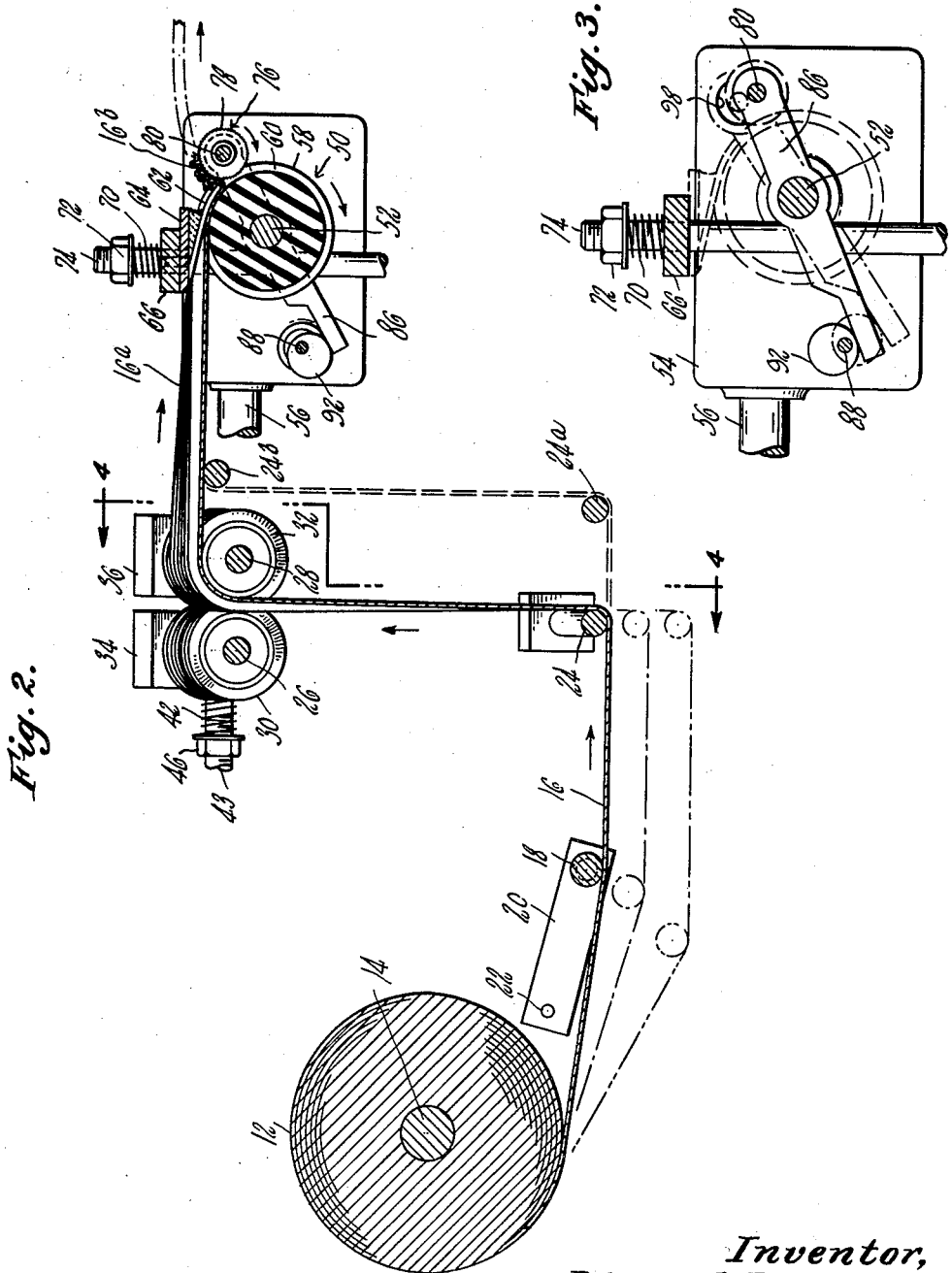

Dec. 1, 1959   R. R. WALTON   2,915,109
CONDENSING TRAVELING SHEET MATERIALS
Filed May 7, 1957   8 Sheets-Sheet 3

Inventor,
Richard R. Walton,
by [signature] Atty

Dec. 1, 1959  R. R. WALTON  2,915,109
CONDENSING TRAVELING SHEET MATERIALS
Filed May 7, 1957  8 Sheets-Sheet 4

Inventor
Richard R. Walton
by [signature]
Atty.

Dec. 1, 1959    R. R. WALTON    2,915,109
CONDENSING TRAVELING SHEET MATERIALS
Filed May 7, 1957    8 Sheets-Sheet 5
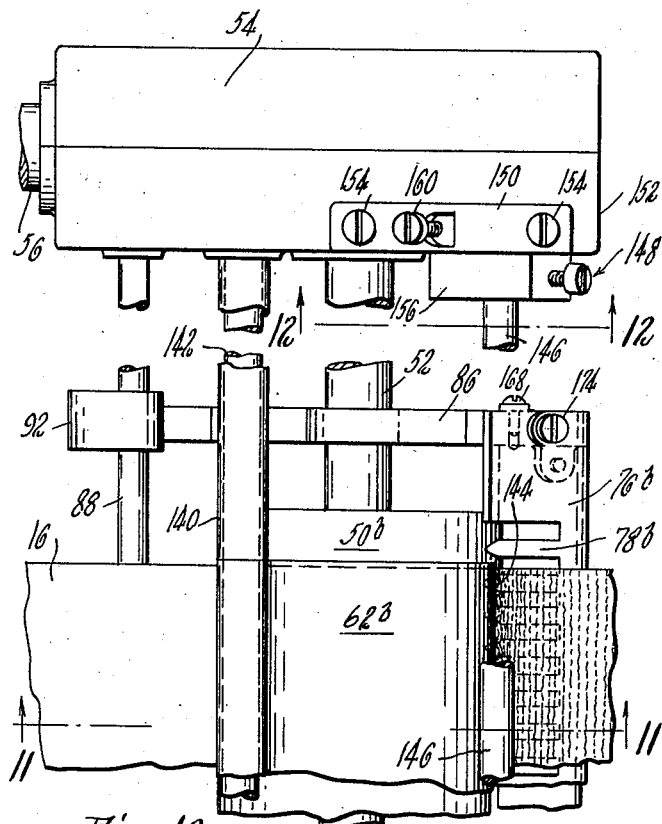
Fig. 10.
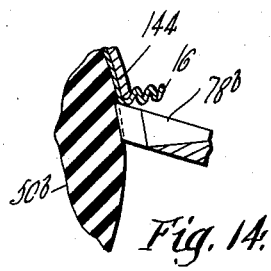
Fig. 14.
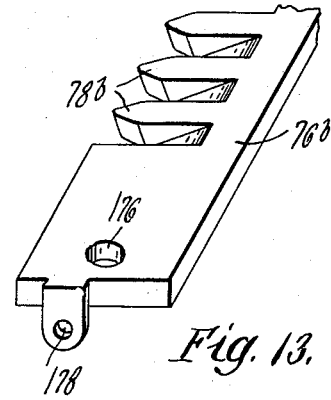
Fig. 13.
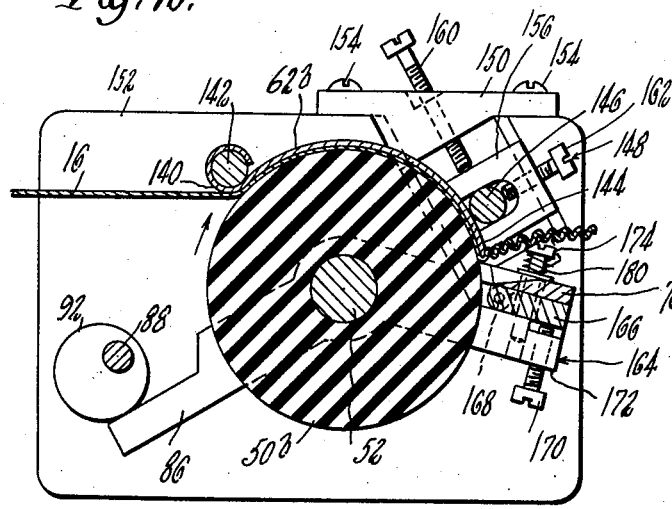
Fig. 11.    Fig. 12.
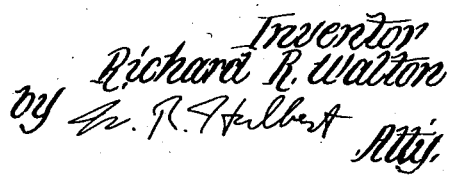
Inventor
Richard R. Walton
by  M. R. Hulbert
         Atty.

Dec. 1, 1959  R. R. WALTON  2,915,109
CONDENSING TRAVELING SHEET MATERIALS
Filed May 7, 1957  8 Sheets-Sheet 6

Inventor
Richard R. Walton
by [signature]
Atty.

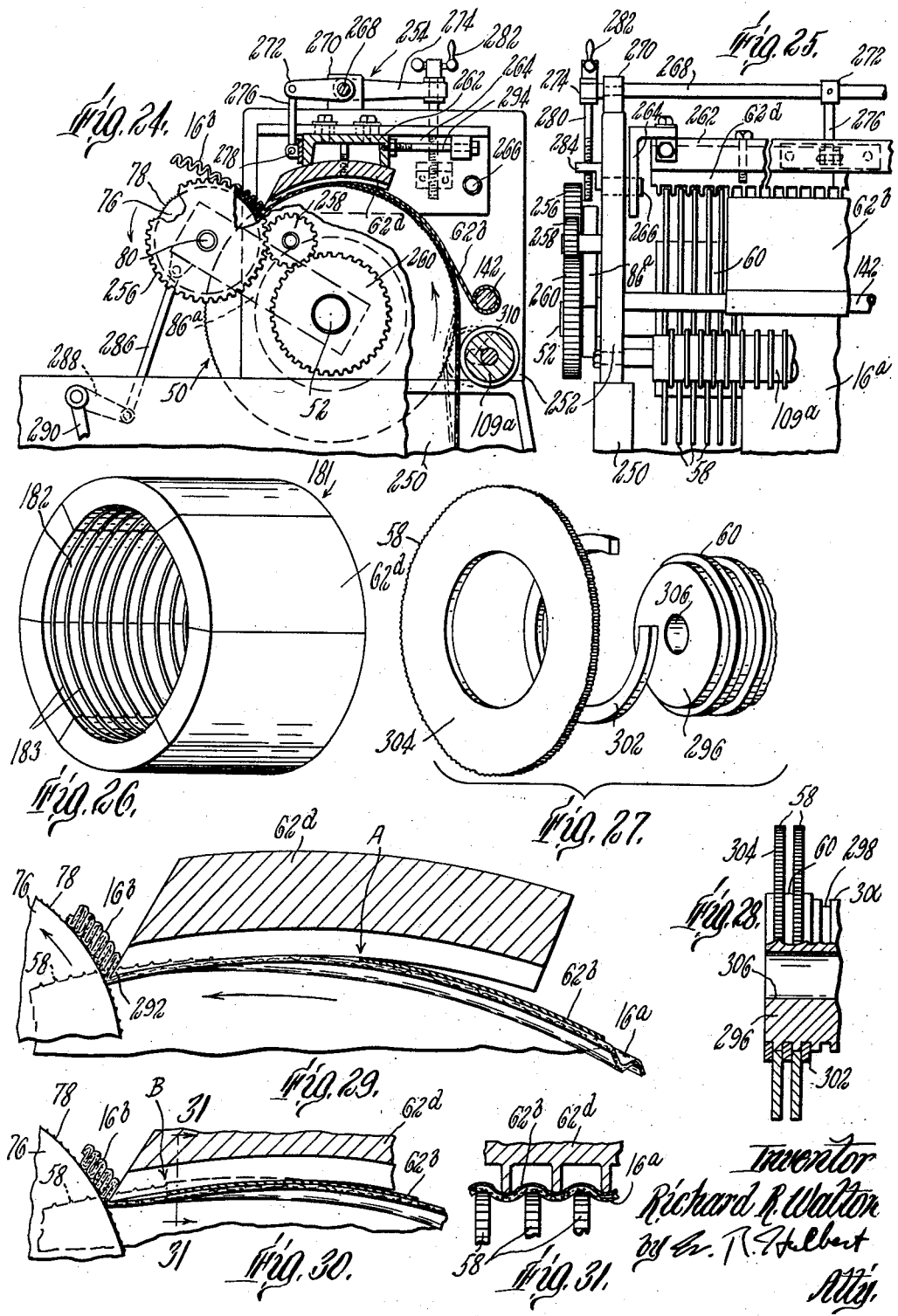

2,915,109

CONDENSING TRAVELING SHEET MATERIALS

Richard R. Walton, Boston, Mass.

Application May 7, 1957, Serial No. 658,213

19 Claims. (Cl. 154—30)

The present invention relates to the condensing of sheet materials and includes the creping of a web of paper or other deformable sheet material and the compacting together of the fibers or other components of sheet materials. More particularly the invention is concerned with a new and improved process and apparatus for condensing a sheet material in a single continuous operation either widthwise or lengthwise or, in some cases, in both directions simultaneously.

This is a continuation in part of my application Serial No. 587,605, now abandoned, which was in turn copending with my application Serial No. 391,055, which has matured into Patent No. 2,761,490.

For purposes of clarity, the following terminology will be used:

Condensing or condensation of a web refers generally to the creping, crinkling or pleating thereof and/or compacting together of the fibers or other components thereof with or without imparting a noticeable permanent crepe, crinkle or pleat in the final product.

Longitudinal creping or condensing refers to imparting crepes, pleats, crinkles or corrugations which run lengthwise of the web which is therefore condensed widthwise and includes widthwise compacting together of its fibers or other components with or without imparting a noticeable permanent crepe, crinkle or pleat in the final product.

Transverse creping or condensing refers to imparting crepes, crinkles, pleats, or corrugations which run widthwise of the web which is therefore condensed lengthwise and includes compacting together of its fibers or other components in the direction of the length of the web with or without imparting a noticeable permanent crepe, crinkle or pleat in the final product.

The term web will be used to denote any running length of sheet material capable of being processed in accordance with the invention.

It is an object of the present invention to provide an improved process and apparatus for changing the degree of condensation of a web, in either a transverse or longitudinal direction, or both, in a manner yielding not only an improved product but more efficient, economical and rapid production.

A further object of the invention is to provide an improved process and apparatus for condensing a web whereby the web may be condensed both longitudinally and transversely and the degree of condensation in either direction readily controlled.

Still another object of the invention is to provide a novel process and apparatus capable of successfully condensing a web of very low moisture content, thereby either completely eliminating or very substantially reducing the requirements both for initially moistening the web and for drying the condensed product.

Still a further object of the invention in one mode of operation thereof is to provide a novel process and apparatus for compacting together the fibers or other components of webs of some materials whether or not any permanent noticeable crepe, crinkle or pleat is imparted thereto.

Yet another object of the invention is to provide a novel process and apparatus for successfully condensing webs of certain difficult materials such as those containing glass or other brittle fibers or very thick and stiff materials or doubled materials.

In accordance with the invention I provide a transverse creping assembly followed by a longitudinal creping assembly, the web being led successfully through the two. In the first assembly it is condensed widthwise and in the second it is condensed lengthwise. Provision is made for by-passing the first assembly in the event that it is desired only to condense the material lengthwise.

In accordance with the invention, I condensed the web widthwise in the longitudinal creping unit by drawing it about curved rolls having a common center of curvature and arranged in one of several ways, as hereinafter more fully explained. The web may be drawn through the first assembly by the action of the second assembly which comprises the transverse creping unit. The second assembly includes means providing an interrupted gripping surface which grips and draws the web along. Preferably such means comprises the surface of a roll provided with alternating circumferential ribs and grooves which may be of a permanent character or appear only transiently at the line of discharge where transverse creping (lengthwise condensation) occurs. The ribs have frictional web-gripping surfaces, such as serrations. The web is led onto these surfaces, either after being provided with longitudinally running corrugations by the first assembly or directly from a stock roll, and thence beneath mechanical pressure means which presses the web against the gripping surfaces as the roll carries the web forward, the pressing means being provided with smooth, preferably polished, surfaces which present relatively slight frictional resistance to the passage of the web. The web passes around the roll through a sufficient arc from the line of incidence thereof to eliminate substantially all lengthwise tension thereon in the discharge zone. This arc will vary with different sheet materials and also with different surface characteristics of the web-gripping surface of the roll. Beyond the line of maximum pressure of the pressing means I mount a take-off comb, which may comprise a series of fingers or a series of rotatable take-off wheels intersecting the roll in such a manner as to extend into the grooves, the comb being rotated in the same direction as, but at a different peripheral speed than, the roll, to lift the web from the roll and simultaneously to change the degree of condensation of the same in the direction of its length.

In one form of the invention, the pressing means comprises a shoe having a series of smooth fingers or elongated ridges, each serving to press portions of the web at least partially down into the grooves of the driven roll. The shoe is mounted to permit adjustment of the pressure exerted thereby. Where the web has previously been provided with longitudinally running corrugations, the alternating ribs and grooves of the driven roll preferably correspond with the alternating ridges and valleys previously formed in the web. Thus, these corrugations are preserved and set, and the material, when discharged by the comb, will be condensed in both directions. I may employ a thin flexible metallic sheet, partially wrapped around the creping roll and extending under the input side thereof and pressing the web thereagainst for the purpose of additionally controlling the movement of the traveling web and the nature of the crepe imparted thereto. The discharge comb is preferably adjustably mounted so that the distance between the discharge end of the shoe and the comb may be readily varied, thus to vary the fineness of the transversely running crinkles, Under certain conditions, the fineness of the condensing operation is such that the components of the sheet material may be compacted together producing a product which is compacted or preshrunk without having a noticeable crepe or crinkle in its finished form. Also under certain conditions and where only transverse creping is to be performed, the pressing means may constitute a smooth shoe without protruding fingers. Further, the driven roll may have an uninterrupted surface and be composed of resilient or deformable material capable of being indented by the fingers of a stationary take-off comb so as transiently to produce only at the discharge area the alternate circumferentially directed ridges and grooves into which the discharge comb extends. The invention also includes a special creping roll construction having unique features of advantage for use in the transverse creping unit.

Still further objects, features and advantages of the invention will become apparent from the following detailed description of presently preferred embodiments thereof taken in conjunction with the accompanying drawings in which like numerals designate like parts in the several views and in which:

Fig. 2 is a longitudinal cross-sectional view taken on line 2—2 of Fig. 1;

Fig. 3 is a fragmentary sectional view on a slightly enlarged scale of the transverse creping assembly taken on line 3—3 of Fig. 1;

Fig. 10 is a plan view of a portion of a still further modified form of the transverse creping assembly in which a deformable roll has been substituted for the circumferentially grooved roll of the previous embodiments cooperating with a stationary comb in place of a rotary comb, the comb teeth indenting the roll transiently to produce alternating ridges and grooves;

Fig. 11 is a sectional view taken on line 11—11 of Fig. 10;

Fig. 12 is a fragmentary side view taken on line 12—12 of Fig. 10 showing the comb adjusting mechanism;

Fig. 13 is an isometric view on an enlarged scale of a portion of the special form of stationary comb used in the embodiment of Fig. 10;

Fig. 14 is a fragmentary sectional view illustrating the mode of operation of the assembly of the embodiment of Fig. 10;

Fig. 24 is an end view in elevation, partly in section, of a still further modified form of transverse creping unit, showing in greater detail an improved manner of mounting the shoe and employing a flexible metallic sheet to supplement the action of the shoe;

Fig. 25 is a rear view in elevation of a portion of the device as shown in Fig. 24;

Fig. 26 shows the cylindrical blank from which the segments of the creping shoe are cut;

Fig. 27 is an exploded view in perspective showing the manner of assembly of the elements which form the principal creping roll;

Fig. 28 is a fragmentary, longitudinal sectional view through the roll as shown in Fig. 27;

Fig. 29 is a transverse sectional view on an enlarged scale of a portion of the transverse creping unit of Fig. 24 illustrating the creping action;

Fig. 30 is a view similar to that of Fig. 29 in which the metallic sheet is shown further extended beneath the principal shoe; and Fig. 31 is a vertical sectional view taken on line 31—31 of Fig. 30.

Figure 1:
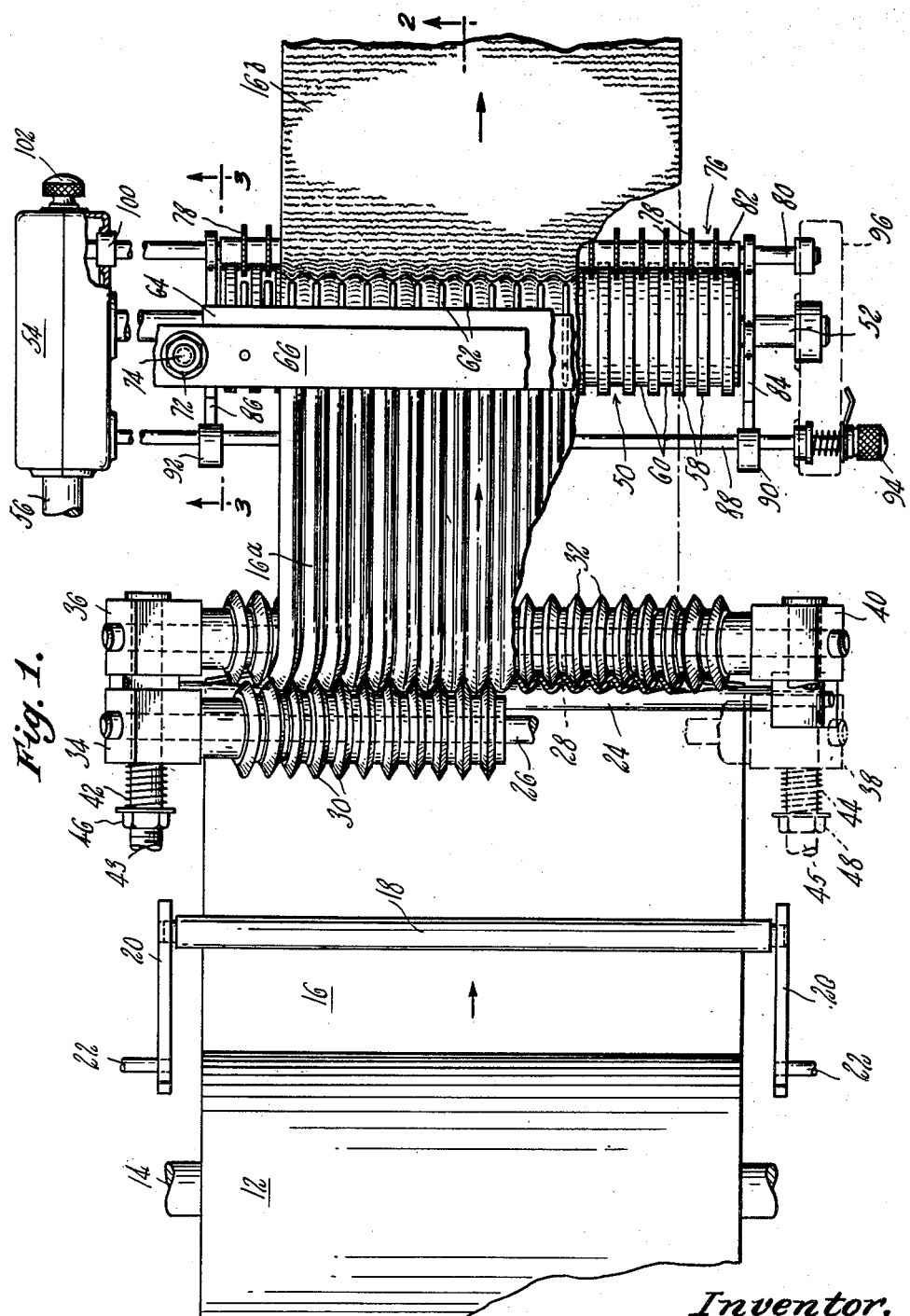
Fig. 1 is a plan view of one preferred form of a complete unit, including both longitudinal and transverse creping assemblies according to the invention.
Figure 4:
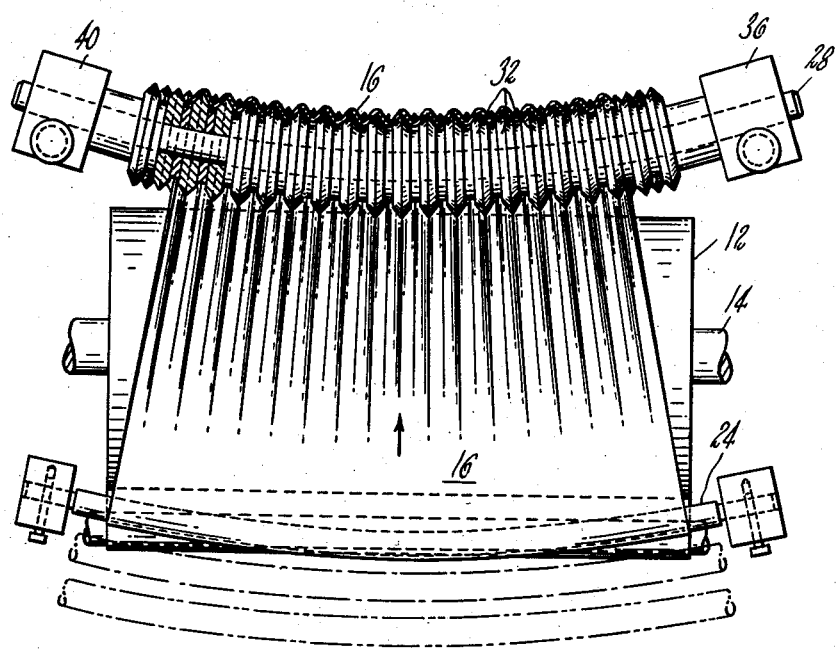
Fig. 4 is a view in elevation of the longitudinal creping assembly, partly in section, taken on line 4—4 of Fig. 2.

Referring first to Figs. 1–4 and 17, the web to be processed, such as paper, is provided in the form of a stock roll 12, freely rotatably held on a shaft 14. The web 16 is led off the stock roll 12 beneath a tensioning bar 18 held by arms 20 for downward pivotal movement about pivot pins 22. The web after longitudinal creping is denoted by the numeral 16a and after transverse creping by the numeral 16b. The web 16 prior to processing may be moistened by means not shown if desired.

After passing beneath the tensioning bar 18, the web travels to the first element of the longitudinal creping assembly, the curved roll 24, which may be a bent rod or shaft. The web is fed onto the convex surface of this curved, width-reducing rod which has a smooth, relatively friction-free surface. It will be noted that in the embodiment shown, this rod 24 is bent in such a way that its convex side is down and the web 16 is led tangentially into engagement with such convex portion and passed about the rod 24 through an arc of approximately 90°. From thence it runs vertically upwardly into the second unit of the longitudinal creping assembly.

The second unit of the longitudinal creping assembly, in this form of the invention, comprises a pair of parallel bent axles 26 and 28, on each of which is mounted a series of side-by-side freely rotatable tapered elements or rollers 30 and 32. The tapered peripheries of the rollers of one series intermesh with the rollers of the other series so that, in effect, the assembly comprises a pair of interfitting grooved rolls, both downwardly convex and with their nip facing toward the width-reducing rod 24. The bent shafts 26 and 28 are held in suitable mountings 34 and 36, 38 and 40. The mountings 34 and 38 may be pressed toward the corresponding mountings 36 and 40 by springs 42 and 44 on rods 43 and 45, the compression of these springs being adjustable by turning the nuts 46 and 48, thereby to vary the pressure between the two series of rollers.

Figure 17:
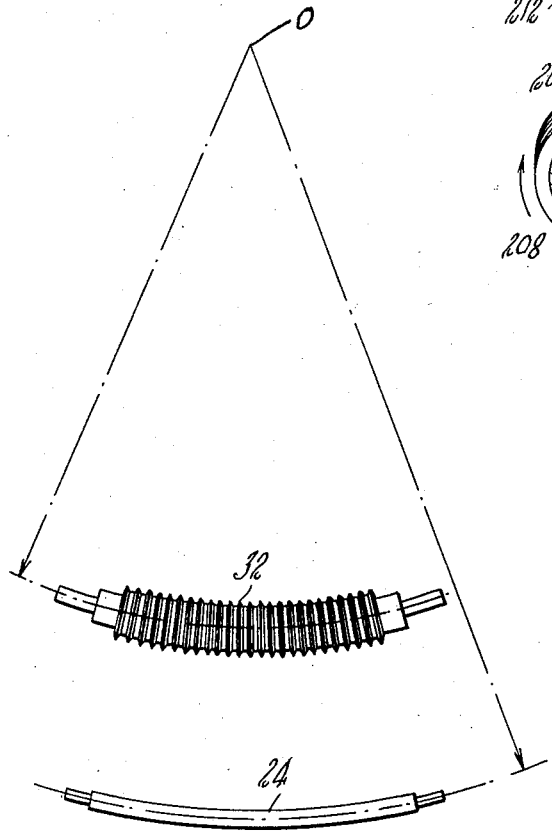
Fig. 17 is diagrammatic representation showing the special relationship between the curvatures of the curved bar and the curved roller assembly of Figs. 1–4.

Fig. 17 illustrates the special relationship between the curvatures of the roller supporting axles 26 and 28 and of the curved bar 24 shown in Figs. 1 and 2. I have found that it is essential that they have substantially a common center of curvature O in order to cause the web to contract uniformly widthwise and eliminate undue strains thereon which might cause tearing.

After passage between the two series of rollers, the web is turned again approximately 90° and is drawn across the concave side of the series of rollers 32 and passes toward the transverse creping assembly.

The latter assembly includes a driven roll 50 (also referred to as the principal creping roll) which draws the web through the preceding unit of the device. The roll 30 is mounted on a suitable drive shaft 52, the latter being driven through the transmission 54 powered by the shaft 56 in any suitable manner. The roll 50 is preferably of rubber or otherwise provided with a frictional, web-gripping surface. The roller 50, in this form of the invention, is provided with permanent alternating circumferential ribs 58 and grooves 60. The alternating ribs and grooves correspond in number with the tapered rollers 32 mounted on the shaft 28. Thus, the longitudinally running valleys formed in the web in the first assembly of the machine will feed naturally into the grooves 60 of the roll 50 (Fig. 2). The web is led tangentially onto the top of the driven roll 50 and immediately thereafter it is pressed firmly against the roll by suitable mechanical pressing means, thereby to assure of its being gripped and pulled forwardly by the frictional gripping surface of the roll. In the form of the invention as shown in Figs. 1–3, this pressing means comprises a series of smooth metallic fingers 62 held on a supporting bar 64 which extends across the entire length of the roll 50. The bar 64 is pressed downwardly by a second bar 66 superposed thereon and the latter is pressed down at both ends by coil springs 70, the compression of which may be adjusted by revolving the nuts 72 on the threaded rods 74.

Just beyond the discharge ends of the fingers 62 is mounted a take-off comb 76 which, in this form of the invention, comprises a series of knurled or toothed wheels 78 mounted to revolve with a shaft 80 and separated by suitable spacing elements 82. Rocker arms 84 and 86 are pivotally mounted intermediate their length upon and near each end of the shaft 52. The arms 84 and 86 at their upper ends support the shaft 80 and at their other ends support the shaft 88. The shaft 88 is a cam shaft provided with a pair of cams 90 and 92 which bear against the ends of the arms 84 and 86 respectively so as angularly to displace the comb 76 about the axis of the driven roll 50 toward or away from the discharge ends of the fingers 62. The movement of the cams 90 and 92 is manually controlled by a knob 94.

The three shafts 52, 80 and 88 are all held at one end in a suitable bearing mounting 96 indicated by broken lines in Fig. 1, and at the other end in the transmission housing 54. The housing 54 is slotted at 98 (Fig. 3) to permit the angular movement of the bearing 100 supporting the shaft 80. The shaft 80 may be driven by any suitable flexible drive to permit this angular displacement during its rotation. The transmission 54 is also provided with a control knob 102 for controlling the relative speeds of the shafts 52 and 80. The transmission 54 may be of any suitable standard construction known in the art and, therefore, the details thereof have not been described.

Figure 20:
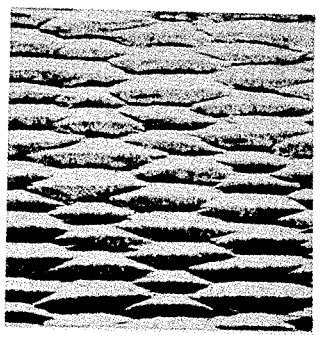
Fig. 20 is a photostat of a paper web which has been condensed only in the direction of its length (i.e., transversely creped) using the device of the embodiment of Figs. 1–4, the direction of travel of the web having been from top to bottom of the sheet as seen in the drawing.
Figure 21:
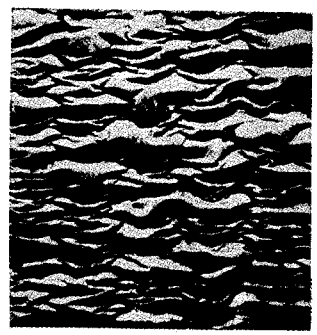
Fig. 21 is a similar view of a paper web which has been so creped in both directions.
Figure 22:
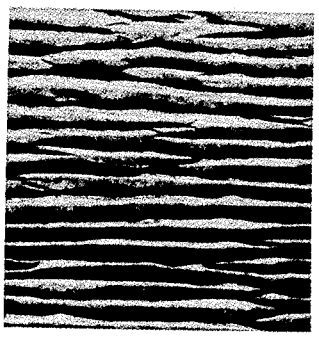
Fig. 22 is a view similar to Fig. 20 of a paper web provided with a one-way transverse crepe in accordance with the invention, utilizing a smooth fingerless shoe, as in Fig. 5, in place of the pressing fingers shown in Figs. 1 and 2.
Figure 23:
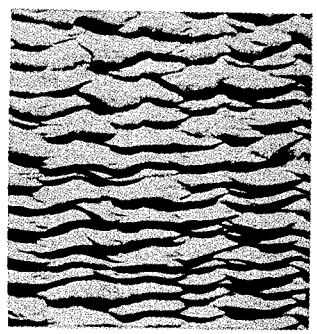
Fig. 23 is a view similar to Fig. 9 of a web condensed in the same web as in Fig. 22 but which is creped in both directions.

In the operation of the embodiment of Figs. 1–4, the sheet material to be condensed is supplied from the stock roll 12 and is threaded around the bar 24 up between the series of rollers 30 and 32, and thence onto the roll 50 beneath the fingers 62. The drive is started and the web-gripping surfaces of the ridges 58 will carry the web forward beneath the fingers 62. The take-off wheels 78 will reach beneath the paper and lift the same from the roll 50. Since the peripheral speed of the wheels 78 is less than that of the roll 50, the paper will be transversely creped, i.e., condensed lengthwise, as illustrated in Fig. 20. As previously described, longitudinally running corrugations will be formed in the web by the action of the intermeshing rollers 30 and 32 prior to arrival of the web at the roll 50. These longitudinal corrugations will be further deepened and set by the action of the fingers 62 and take-off comb 78, producing a product as illustrated in Fig. 21.

In the event that it is desired to compact or crepe the web only in the direction of its length substantially without the formation of longitudinally running corrugations, the bar 24 and rollers 30 and 32 may be bypassed, as indicated by broken lines in Fig. 2. In such event, the web 16 is led beyond the curved rod 34 and is passed around the straight, smooth bar 24a, thence about another straight bar 24b and onto the roll 50, as before. Very little condensing width-wise of the web will occur when the longitudinal corrugating assembly is thus by-passed, and a paper product so processed has the appearance and characteristics as seen in Fig. 20.

Figure 5:
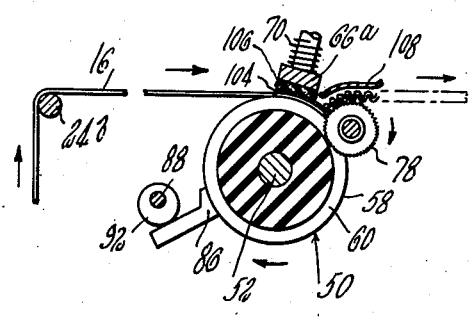
Fig. 5 is fragmentary sectional view through a portion of the transverse creping assembly showing a modification of the means for pressing the web against the driven roll.

In the embodiment of the invention shown in Fig. 5, which is adapted especially for one-way transverse creping, a smooth, polished, metallic shoe 104 has been substituted for the fingers 62. This plate 104 is resiliently pressed by the sponge rubber sheet 106 which in turn is held down by the pressing bar 66a followed by the spring 70. The take-off comb 78 operates as before and I have found that it will very successfully compact or finely crepe the web provided that it is adjusted by action of the cams 90 and 92 to very close proximity to the discharge end of the plate 104, such adjustment in practice is readily made by any skilled operator. In this embodiment, I have found it desirable to provide a take-off shield 108 to guide the condensed web and prevent the same from turning back on itself at the discharge. Such a take-off guide or shield will usually be found necessary in handling materials less rigid than most papers to retain the material in closely compacted condition for subsequent handling.

Figure 6:
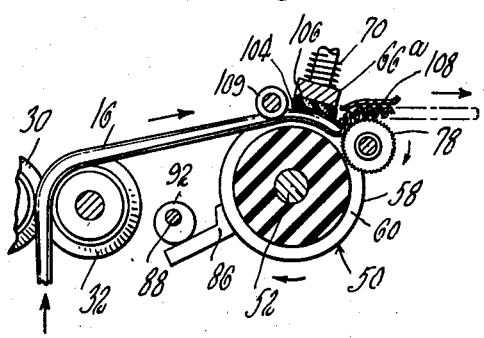
Fig. 6 is a view similar to Fig. 5 showing a still further modification.

The embodiment shown in Fig. 6 is similar to that of Fig. 5, except that a two-way operation is shown, the setting of the longitudinally running corrugations being enhanced by the provision of a grooved roll 109 which presses the corrugated web 16 down into the grooves 60 of the roll 50 at the location where the web 16 is fed onto the roll 50, just prior to passage beneath the smooth, shiny anti-friction shoe 104.

Figure 8:
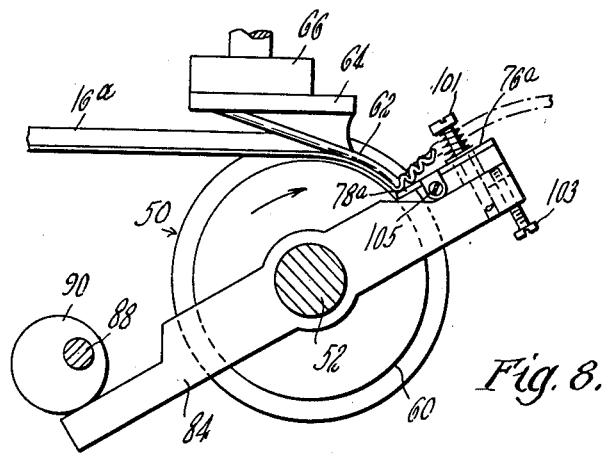
Fig. 8 is a side view, partly in section, taken on line 8—8 of the embodiment of Fig. 7.
Figure 7:
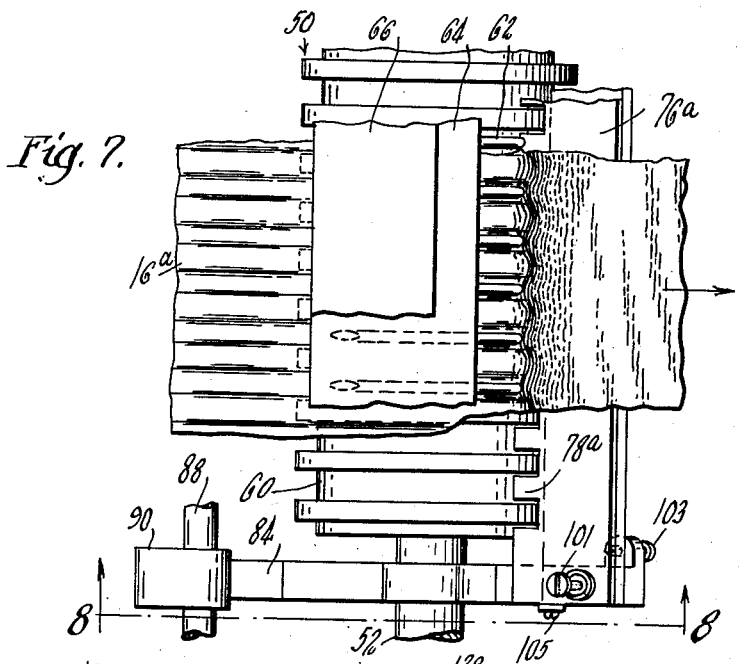
Fig. 7 is a plan view on a somewhat larger scale of a portion of a modified corrugated roll and finger assembly of the transverse creping unit wherein the condensed material is removed from the roll by means of a stationary comb replacing the rotating comb of the previous embodiments.

Referring to Figs. 7 and 8, the specific arrangement whereby a fingered shoe, similar to that shown in Fig. 2, may be employed in conjunction with a stationary take-off comb has been illustrated. The finger supporting members are as in Figs. 1 and 2. The bar holding the fingered shoe is indicated generally by the numeral 64 and the fingers by the numeral 62. It will be observed that the fingers correspond in number and spacing to the grooves 60 as in the embodiment of Figs. 1 and 2. Also in the longitudinal creping assembly the traveling web 16a has been provided with longitudinally running grooves which correspond in number and spacing both to the fingers 62 and the grooves 60, as indicated at the left of Fig. 7.

The take-off comb 76a comprises a plate having projecting teeth 78a which reach into the grooves 60 of the roll 50. The plate 76a is held on supporting bar 84 (and a similar bar, not shown, at the other side of the machine), mounted to swing on the shaft 52 at the end of the roll 50. The plate 76a is clamped in place by clamping screws 101. It is apparent that the distance between the ends of the fingers 62 and the upper surfaces of the teeth 78a of the plate 76a may be adjusted by rotating the adjusting cam 90 by means of its eccentric shaft 88 bearing against one end of the rockable arm 84. Furthermore, the angle of incidence of the plate 76a and its fingers 78a with respect to the surface of the roll 50 may be adjusted by means of the adjustment screws 103, the plate 76a pivoting about the pivots 105.

Thus in the embodiment of Figs. 7 and 8, the already longitudinally creped sheet material 16a is fed in beneath the shoe 64 and the fingers 62, the spacing of which preferably corresponds with the spacing of the corrugations already in the web. These corrugations are further set by depressing the material into the grooves 60 of the roll 50 by the action of the fingers 62 and then at the discharge end of the fingers 62 the web is subject to transverse creping by the action of the fingers 78a of the plate 76a. I have found that different effects from a very tight crepe to a more or less loose regular pleat may be obtained by varying the angle of the discharge comb by means of the adjusting screw 103 and also by varying the distance between the ends of the fingers 62 and the comb fingers 78a by means of the cam 90. These various adjustments to obtain the desired effects are within the skill of the operator of the machine.

Figure 9:
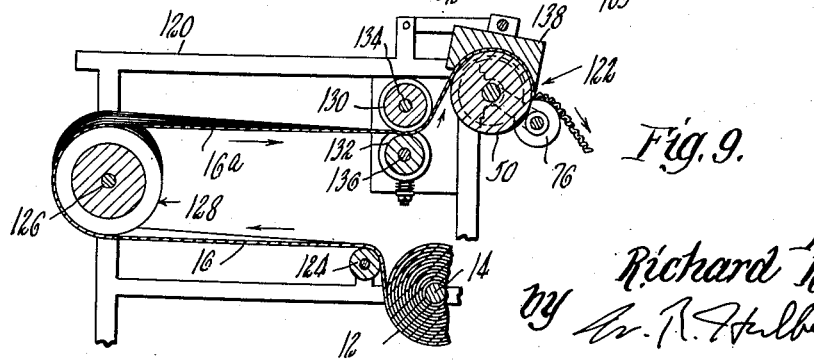
Fig. 9 is a vertical longitudinal sectional view, on a reduced scale and similar to Fig. 2, of a still further modified form of a machine according to the invention, including a pair of tensioning guide rolls just prior to the transverse creping assembly.

A still further modification of the machine in accordance with the invention is illustrated in Fig. 9.

This view illustrates an arrangement whereby the stock roll 12 of material to be processed, to save space, may be mounted beneath the transverse creping assembly 122 rather than offset in the other direction, as shown in Fig. 2. The various components of the machine are here shown mounted on a frame 120, the stock roll being indicated by the numeral 12 held on a shaft 14. Beneath the transverse creping assembly, which is indicated generally by the numeral 122, the web 16 is led off the roll 12 over a rectilinear guide roll 124 through an arc of 180° around a series of rollers 128 rotatable on a curved axle 126. It will be observed that the axle 126 is bent so that it is concave upwardly and the rollers 128 which are like the rollers 32 of the previous embodiments, follow this configuration. The web 16 passes around the series of rollers 128 and reverses its direction 180° and is fed between a pair of rectilinear circumferentially grooved intermeshing rolls 130 and 132. These rolls may be integral or formed of side-by-side tapered rollers rotatably held on shafts 134 and 136, as shown.

These rolls 130 and 132 are not affirmatively driven, but the material 16a is drawn between them by the operation of the transverse creping roll 50. The material 16a, when it leaves the rolls 130 and 132, is directed upwardly and tangentially onto the surface of the grooved creping roll 50 beneath a smooth shoe 138, the web being creped transversely by the rotary take-off comb 76 in the same manner as shown in Figs. 1 and 2. I have found that surfaces of the roll 50 need not have such pronounced frictional web-gripping characteristics if the guide rolls 130 and 132 are so positioned as to lead the web 16 onto the roll 50 at a line of incidence further removed circumferentially from the discharge comb than in the previous embodiments. The greater area of engagement with the roll surface serves to provide sufficient friction to cause the web to adhere and be carried forward with the roll, even using smooth metallic rolls.

In Figs. 10–16, I have illustrated a still further modified form of the invention in which I employ a deformable driven roll in place of the permanently grooved roll of the previous embodiments. It will be observed that the principle of operation is the same, however, since I provide means for transiently deforming this roll into temporary circumferentially directed grooves by the pressure of the teeth of the take-off comb which performs the transverse creping action.

The drive roll in this embodiment comprises a deformable cylindrical roll 50b which may be composed of rubber or other material having the requisite characteristics. It is mounted to be driven by the shaft 52. The shaft 52 is driven by a transmission 54 as in the previous embodiments and the web of sheet material 16 to be condensed is guided onto its surface beneath the forward edge 140 of a specially formed shoe 62b which presses it uniformly against the surface of the roll into positive non-slip feeding engagement therewith. The shoe 62b is preferably formed from a smooth bendable sheet of metal which is held at the forward edge 140 on a rod 142 and which is gripped and pulled downwardly over the roll at its trailing edge 144 by another rod 146 whose pressure against the shoe 62b may be varied by adjustment of the special mountings 148 therefor at both its ends. The construction and mode of operation of the special mountings for the rod 146 is shown in both Figs. 11 and 12. Each mounting comprises a pair of members 150 and 152 held to each other by machine screws 154. The members 150 and 152 are so formed as to provide a slotted opening between them in which may be slidably held an insert 156. This insert may be slid in a direction tangential of the surface of the roll for adjustments in such direction. Each insert is slotted, as at 158, to provide a mounting shiftably holding each end of the rod 146 for adjustment toward and away from the outer surface of the shoe 62b. The adjustment of the insert 156 in its tangential direction is accomplished by rotating the set screw 160, whereas the adjustment of the rod 146 perpendicular to the surface of the roll 50b is accomplished by operation of the adjusting screw 162. Each end of the rod 146 compresses a coil spring 165 which resiliently holds it in the slot 158.

It will be seen that, in effect, the cooperation of the rods 142 and 146 causes the thin resilient sheet metal shoe 62b to be wrapped partly around the surface of the roll 50b, this in contrast to the rigid shoe and finger constructions disclosed in previous embodiments.

In the embodiment of Figs. 10–14, a special form of take-off comb, the configuration of which is best seen in Fig. 13, is provided to strip the web from the roll 50b and at the same time perform a transverse creping action. The comb is indicated generally by the numeral 76b and its teeth by the numeral 78b. The comb is formed from a metallic plate which is held in the adjustable mountings 164 at each end of the drive roll. Each mounting 164 corresponds to the mountings of the previous embodiments, permitting adjustment of the comb toward and away from the surface of the roll 50b and also pivotal movement thereof about the axis of the driven roll toward and away from the edge 144 of the shoe 62b. This latter motion, of course, is accomplished by rocking the arm 86 which is pivoted on the shaft 52 by means of the cam 92 mounted on the shaft 88, such as in Figs. 1–4. The plate 76b rests on a pivotally mounted support 166 which can pivot about the pin 168, the pivotal adjustment being effected by operation of set screw 170. The plate is held to the base member 172 of the assembly by a pair of set screws 174 which fit loosely in the apertures 176 in the plate 76b. The pivot pin 168 fits snugly but rotatably in the aperture 178, permitting pivotal movement of the plate counterclockwise as seen in Fig. 11. Since the apertures 176 are enlarged, there is sufficient clearance to permit this movement. Furthermore, the fastening screws 174 bear on springs 180 which permit the plate to yield upwardly when the screw 170 is moved inwardly. Thus it will be seen that the special take-off comb 76b is mounted in a very flexible manner so as to permit a wide variety of adjustments not only normally toward and away from the surface of roll 50 but also circumferentially of the surface and also to be tilted at various angles to such surface.

The operation of this embodiment will be readily apparent from Fig. 14, wherein it will be seen that each tooth 78b indents the surface of the resilient roll 50b temporarily forming a circumferentially oriented groove therein and reaching beneath the surface of the web 16 so as to lift the same off the surface of the drive roll while at the same time performing the transverse creping action. In the course of time the abrasion of the teeth 78b on the roll 50b may wear permanent grooves therein and when this occurs the operation of the machine will be as in the previously described embodiments.

Figure 15:
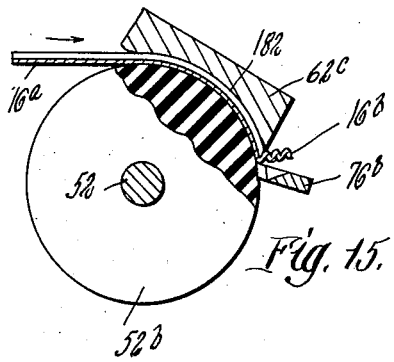
Fig. 15 is a view similar to Fig. 14, on a somewhat reduced scale, showing a modified form of shoe which may be used in the transverse creping assembly of Figs. 10–14.
Figure 16:
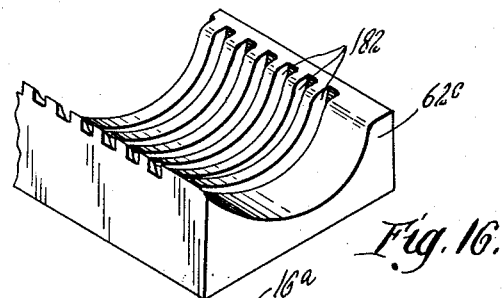
Fig. 16 is an isometric view (inverted to avoid optical illusions) of a portion of the modified shoe of Fig. 15.

Referring to Figs. 15 and 16, an alternative form of shoe 62c is shown which may be substituted for the bendable shoe 62b of Figs. 10-14. This shoe 62c is formed with internal grooves 182 which serve to accommodate the upstanding ridges of a web 16a which has already been subjected to the longitudinal creping action for a two-way creping operation. The take-off comb 76b used with this grooved shoe 62c is the same as that illustrated in Fig. 13.

Figure 18:
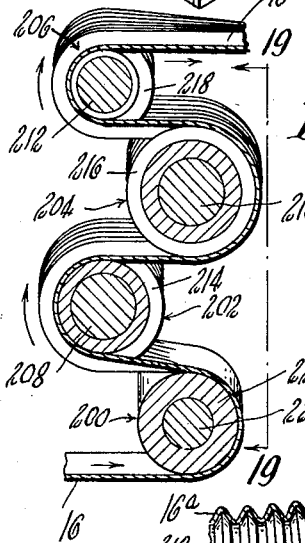
Fig. 18 shows in fragmentary vertical section a modified longitudinal creping assembly which may be substituted for the curved bar and roller assembly of Figs. 1–4 and 17.
Figure 19:
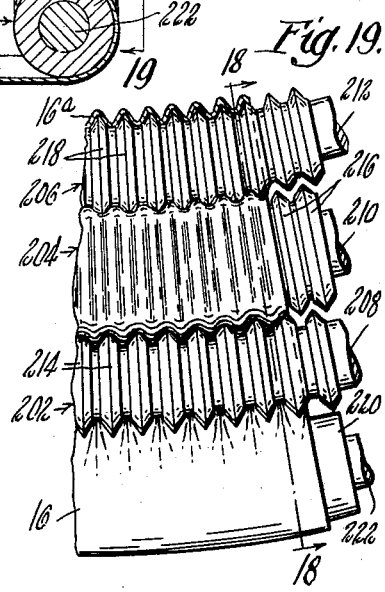
Fig. 19 is a fragmentary view in elevation of such modified assembly as indicated by line 19—19 of Fig. 18.

In Figs. 18 and 19 I have illustrated a still further modification of the longitudinal creping assembly which may be substituted for the arrangement of Figs. 1 and 2. In this alternative embodiment, the principle of operation remains the same but greater flexibility and somewhat more efficient use of the available space is made and with some sheet materials control of the traveling web is improved.

In this embodiment I arrange a plurality of bent rolls in staggered relation and pass the web about them in succession, the web following a somewhat sinuous path. I have used the term "roll" somewhat loosely; more accurately the lowermost roll constitutes a curved bar 200 performing the same function as the smooth, bent bar 24 in the other embodiments. As seen in Fig. 18, the uncreped web 16 is fed tangentially onto the downwardly convex lower surface of the smooth bar 200, is passed thereabout approximately 180°, reversing its direction, thence onto the next higher roll 202. The upper rolls 202, 204 and 206 are made up in the same manner as the rolls 30 and 32. In other words, each comprises a bent axle 208, 210 and 212 on which are mounted a series of rotatable members 214, 216 and 218. The smooth bent bar 200 may be a single piece in arcuate form or, alternatively, be composed of a sleeve 220 on a bent axle or rod 222. The centers of curvature of the axles 222, 208, 210 and 212 all lie substantially on the same line, which would be normal to the sheet with reference to Fig. 19, so that the web in passing over the successive rolls will converge uniformly and be subjected to a uniform tension throughout its width. Thus, the relationship between the curvatures of the rolls in this embodiment is, in principle, the same as that shown in Fig. 17 with respect to the previous embodiments. This special relationship must be employed whenever the longitudinal creping assembly includes more than a single curved roll (as in Fig. 9); i.e., successive rolls about which the web passes must have a common center of curvature with that of the first roll. In each case, the web must pass about the one or more rollers through a total arc of either 180° or a multiple of 180°. Thus, in the embodiment of Figs. 18 and 19, the total arc is four times 180° since four rolls are used and the web passes 180° about each of the rolls. On the other hand, in Figs. 1, 2, and 17, the total arc is only 180°, 90° about each of the two rolls. In the embodiment of Fig. 9, but a single roll is used and the web passes about it through a total arc of 180°. It is evident that this principle, once understood, can be put into practice in a number of different ways and the invention is clearly not limited to the specific arrangements shown.

Briefly, in the operation of the embodiments of Figs. 18 and 19, the web 16 is threaded back and forth about the rolls starting from the bottom emerging from the uppermost roll 206 as a longitudinally corrugated sheet 16a, ready to be introduced into any form of transverse creping unit according to the invention. None of the rolls in this embodiment is driven and the web is pulled through the assembly by the drawing action of the driven roll of the transverse creping assembly.

In Figs. 24, 25, 29, 30 and 31, I have illustrated a special form of the invention in which the action of the grooved shoe is supplemented by the use of a thin metallic foil or sheet similar to that shown in Fig. 11. Also in the embodiment of these figures I have utilized a special form of shoe and novel mounting therefor and have illustrated a presently preferred form of principal creping roll.

Referring first to Figs. 24 and 25 showing only the transverse creping assembly according to the invention, the numeral 250 represents a supporting frame on which the remaining elements are mounted. Extending upwardly from the frame 250 at each end thereof (only one end being shown in these figures) is a mounting plate 252 with appropriate openings and bearings therein to support the main shaft 52, the creping roll 50 being mounted thereon, a corrugated pressing member in the form of a roll 109a, the shoe supporting and adjusting assembly indicated generally by the numeral 254. For convenience, the grooved pressing member 109a takes the form of a corrugated roll, but the same is non-rotatably held in the plate 252 and it will be evident that this member could take forms other than that of a roll. The alternate ridges and grooves press against the incoming web suitably directing the same into the corresponding grooves of the main roll 50. It will be noted that the roll 109a is held in a slot 310 in the plate 252 for adjustment toward and away from the surface of the principal creping roll 50. When shifted to the position shown in dotted lines in Fig. 24, the pressing member 109a forcibly guides the web into the grooves of the principal creping roll. The braking effect thus produced prevents bubbling or rippling of the web as it is pulled forward by the surfaces 58. The pinions 256, 258 and 260 interconnect the shaft 52 of the creping roll 50 and the shaft 80 of the take-off comb 76. The shoe 62d (substantially identical with that shown in Fig. 15) utilized in this embodiment of the invention is made up of segments of an internally grooved cylinder 181 shown in Fig. 26, cut along the lines as indicated. These segments are chrome plated and are assembled side by side on a supporting plate 262 in sufficient number to extend the width of the machine. The plate 262 in turn is firmly affixed to a pair of plates 264 at each side of the machine, the same being mounted by means of a pivot pin 266 on the frame 252. A shaft 268 is mounted in an upwardly extended portion 270 of the member 252 and extends from one side of the machine to the other and has rigidly mounted thereon a lever arm 274 and a pair of lever arms 272. One of the arms 272 is located at position which is spaced from one end of the roll 50 a distance of one-third the length of such roll; the other arm 272 (not shown) is similarly spaced from the other end of the roll 50. Each arm 272 has pivotally attached thereto at its outer end a downwardly depending connecting rod 276 firmly connected to the forward edge of the mounting plate 262 by means of a pin 278. The outer end of the arm 274 receives a screw-threaded rod 280 provided with a handle 282 by means of which it may be rotated. The threaded portion of the rod 280 passes through a threaded opening in a bracket 284 mounted on the plate 252. Since the arms 272 and 274 are both rigidly connected to the rod 268, it will be seen that the downward pressure which the composite shoe will exert on the web which passes between it and the creping roll may be adjusted by rotation of the handle 282 in one direction or the other.

The principal creping roll 50 may be driven in any suitable manner as in the previous embodiment. The take-off comb 76 is driven from the pinion 260 on the main shaft 52 through the pinion 258 to the pinion 256 which revolves the comb. By suitable selection of the diameters of the pinions, any desired speed ratio between the creping roll and the take-off comb may be obtained. As in the previous embodiments, the take-off comb is mounted in such a way that it can be pivoted bodily about the axis of the principal creping roll to positions closer or further from the discharge edge of the shoe. In this embodiment of the invention such pivotal mounting is accomplished by mounting the shaft 80 in bearings in one end of the arm 86a, the other end of which rocks on the main shaft 52, this arrangement being duplicated at the other side of the machine. The rocking of the bar 86 is accomplished by an arrangement of levers 286, 288, and 290 mounted on the main frame 250 of the machine.

In this form of the invention I optionally employ the flexible metallic foil or sheet 62b of Figs. 10 and 11 mounted on a bar 142 which in turn is rigidly held in appropriate openings in the end plate 252. Turning to the enlarged view of Fig. 29 it will be seen that the foil 62b serves to maintain frictional engagement between the web 16a and the surfaces 58 of the principal creping roll 50 up to a line indicated by the letter A where the ridges of the shoe intersect the surfaces 58. Thus by the time the web reaches the line of advance A, it has been in frictional engagement with the gripping surfaces 58 a sufficient distance so as greatly to reduce any effect of tension or drag due to the fact that the creping roll is the driving means for pulling the web forward. After passing from beneath the forward edge of the metal foil, the web is then pressed by the smooth ridges 183 gradually downwardly into the grooves of the principal creping roll and is extruded from beneath the forward edge 292 of the composite shoe. The great pressure exerted uniformly on the web by the action of the shoe causes a preliminary fine creping or embossing of the same by the serrations of the surfaces 58 of the creping roll. The paper is forced into the depressions thereof, assuring that the creping roll will firmly grip the web and pull it forward. After extrusion from beneath the shoe, the web is lifted from the creping roll by the serrated surfaces 78 of the take-off comb 76, the action being essentially the same as that produced by the machines of the previous embodiments. Major adjustments of the distance the metal sheets 62b extends beneath the shoe 62d is effected by choice of the dimensions of the sheet. Also the sheet may be wrapped around the shaft 142 in such a manner that it may be unrolled to the desired distance. More critical adjustments of the position and angle of the shoe and the pressure which it exerts are effected by operating the hand wheel 282 and also by adjusting the threaded bolt 294 forwardly or backwardly depending upon results desired.

In Fig. 30 an adjustment is shown wherein the foil 62b has been extended forwardly to a line indicated by the letter B. In this position the thin sheet metal member is itself pressed downwardly by the ridges of the shoe so as, partially at least, to assume the configuration of the web 16a being processed. This corrugated effect is clearly apparent from the fragmentary view of Fig. 31. Also it will be observed that when the foil is used in this manner its forward edge is just visible viewed from the discharge side of the machine and looking down between the forward ends of the ridges of the shoe. I have found that the use of the foil 62b in the manner shown in Fig. 29 serves as an aid to guide the web uniformly onto the creping roll, thus reducing any irregularities in the crepe produced and avoiding possible tearing of the web near the edges. The web is fed straight onto the surface of the roll and any tendency on its part to pull to either side, creating distorting or tearing strains, is eliminated. The foil acts on the web up to the line of first engagement with the shoe. With respect to the arrangement of Fig. 30, I have found that the use of a thin metallic foil between the bottom surface of the shoe and the upper surface of the web being creped greatly reduces strain and wear on the shoe itself. Thus the flexible sheet of metal serves in the nature of an inexpensive replaceable shoe which may be discarded and replaced at frequent intervals, if necessary, at relatively low cost.

In Figs. 27 and 28 I have shown a preferred manner of assembling the principal creping roll for the purpose of reducing the cost of manufacture. Instead of machining alternative grooves and ridges in a solid shaft, I have found that an equally serviceable roll may be produced by assembling a series of relatively inexpensive members on a hollow shaft. Here it will be seen that the hollow shaft, denoted by the numeral 296, is provided with a series of shallow peripheral grooves 298 (Fig. 28) with intervening circumferential ribs 300. I snap into the grooves 298 resilient split rings 302, whose outer peripheries become the surfaces 60 which define the bottoms of the grooves of the creping roll. Alternating with the rings 302 are mounted the discs 304 whose serrated peripheries provide the surfaces 58 of the creping roll. The central bore 306 of the shaft 296 is adapted to receive the main drive shaft 52, the latter being held therein in any suitable manner. To provide long life the surfaces 58 are flame sprayed with molybdenum providing an extremely hard and enduring surface.

In essence, the operation of the embodiment of Figs. 24, 25, 29, 30 and 31 is the same as that of Figs. 1 and 2, the shoe being essentially the same as the shoe 62c shown in Fig. 16. Special advantages are optionally obtainable utilizing this embodiment of the invention by pivoting the shoe on an axis spaced rearwardly of the main shaft 52 so that the drag of the forwardly propelled web tends to draw the shoe downwardly, thereby increasing the effective pressure exerted by it on the web. I have found that great forces are exerted on the shoe itself in the creping operation and the special mounting shown in Figs. 24 and 25 eliminates any tendency of the shoe to be distorted by the effect of these pressures. Furthermore, the mechanical advantage of the screw and lever arrangement for rocking the shoe permits accurate adjustment of the pressure which it will exert in a simple and easy manner. By placing the rods 276 symmetrically across the width of the machine, the downward force exerted on the shoe by operation of the handle 282 is evenly spread, and there is no tendency to distort the shoe.

While the invention has been described primarily in terms of condensing of traveling webs in one or both directions, it should nevertheless be understood that uses may be found for the apparatus of the invention in which, in effect, the web is run through the longitudinal creping assembly in a reverse direction so as to be stretched widthwise and in which in the transverse creping mechanism a rotary take-off comb is used, the surface speed thereof being increased beyond that of the driven roll, thus tending to elongate or stretch or lessen the degree of condensation of the web in the direction of its length.

While I have disclosed and described herein various presently preferred embodiments of the invention, it nevertheless should be understood that the same is susceptible of various modifications and changes by those skilled in the art and, therefore, I intend that the scope of the appended claims should be subject only to those limitations required by the prior art.

I claim:

1. A device for condensing in the direction of its length a traveling web comprising, in combination, a driven roll having alternating circumferential ribs and grooves formed at least through a portion of its circumference, said ribs having frictional web-gripping surfaces, mechanism for feeding said web onto said roll at a location thereon as it passes through said portion, mechanical pressing means arranged to press said web into said grooves on said roll as it is carried forward by the latter, the web-engaging portion of said pressing means being smooth and presenting relatively slight frictional resistance to the passage of said web, and a rotatable take-off comb mounted so as to intersect said roll and extend into said grooves at a location within said portion of the circumference of said roll and in closely spaced relation to the discharge edge of said pressing means to lift said web from said roll and simultaneously condense the same in the direction of its length.

2. A device for condensing a traveling web in the direction of its length comprising, in combination, a driven roll provided with alternating circumferential ribs and grooves, said ribs having frictional web-gripping surfaces, mechanism for feeding said web onto said roll at one location thereon, mechanical pressing means arranged to press said web into said grooves on said roll as it is carried forward by the latter, the web-engaging portion of said pressing means being smooth and presenting relatively slight frictional resistance to the passage of said web, a rotatable take-off comb mounted so as to intersect said roll and extend into said grooves at a location in closely spaced relation to the discharge edge of said pressing means, and driving mechanism arranged to rotate said comb in the same direction as but at a lower peripheral speed than said roll to lift said web from said roll and simultaneously condense the same in the direction of its length.

3. A device for condensing a traveling web in the direction of its length comprising, in combination, a driven roll provided with alternating circumferential ribs and grooves, said ribs having frictional web-gripping surfaces, mechanism for feeding said web onto said roll at one location thereon, a series of side-by-side spaced fingers mounted in predetermined relation to the surface of said roll and arranged to press said web into said grooves as it is carried forward by said roll, the web-engaging portions of said fingers being smooth and presenting relatively slight frictional resistance to the passage of said web, and a rotatable take-off comb mounted so as to intersect said roll and extend into said grooves at a location in closely spaced relation to the discharge ends of said fingers, and driving mechanism arranged to rotate said comb in the same direction as but at a lower peripheral speed than said roll to lift said web from said roll and simultaneously condense the same in the direction of its length.

4. A device as claimed in claim 3 including adjusting means for varying the distance between the ends of the fingers and said comb.

5. A device as claimed in claim 3 in which said comb is mounted upon an adjustable mounting pivoted on the axis of said roll.

6. A device for widthwise condensing of a traveling web which comprises a smooth curved bar, a pair of mutually spaced parallel bent axles mounted with their convex portions facing the concave portion of said first-named bar, a series of interfitting rollers freely rotatable on each of said axles, the rollers of one of said series intermeshing with rollers of the other series, guiding means for directing said web onto the convex side of said bar and drawing means for drawing the same approximately 90° around said bar and from said bar through said intermeshing rollers and approximately 90° around the rollers of one of said series on the concave side thereof, said bar and said axles having their centers of curvature on a line perpendicular to the planes in which they lie.

7. A device for longitudinally creping a traveling web which comprises a staggered seris of curved rolls at least some of which are provided with alternating circumferential ridges and grooves, said rolls lying in parallel planes and being so arranged that said web may be passed about the same in succession from the convex to the concave side of each thereof through an arc of approximately 180°, said rolls having their centers of curvature on a line perpendicular to said planes, and mechanism for drawing said web through said series of rolls.

8. A device for varying the degree of condensation of a traveling web in the direction of its length comprising in combination a driven roll provided with alternating circumferential ribs and grooves, said ribs having frictional web-gripping surfaces, mechanism for feeding said web onto said roll at one location thereof, a shoe having smooth elongated pressing portions corresponding to said grooves arranged to press said web against said roll and at least partly into said grooves as said web is carried forward by said roll, the web-engaging portions of said shoe being smooth and presenting relatively slight resistance to the passage of said web, and a rotatable take-off comb having frictional web-gripping surfaces mounted so as to intersect said roll and extend at least partially into said grooves at a location in closely spaced relation to the discharge edge of said shoe, and driving mechanism arranged to rotate said comb in the same direction as but at a different peripheral speed from that of said roll to lift said web from said roll and simultaneously alter the degree of condensation of the same in the direction of its length.

9. A device for varying the degree of condensation of a traveling web in the direction of its length comprising in combination a driven roll provided with alternating circumferential ribs and grooves, said ribs having frictional web-gripping surfaces, mechanism for feeding said web onto said roll at one location thereof, a shoe having smooth elongated pressing portions corresponding to said grooves arranged to press said web against said roll and at least partly into said grooves as said web is carried forward by said roll, the web-engaging portions of said shoe being smooth and presenting relatively slight resistance to the passage of said web, a rotatable takeoff comb having frictional web-gripping surfaces mounted so as to intersect said roll and extend at least partially into said grooves at a location in closely spaced relation to the discharge edge of said shoe, driving mechanism arranged to rotate said comb in the same direction as but at a different peripheral speed from that of said roll to lift said web from said roll and simultaneously alter the degree of condensation of the same in the direction of its length, and a sheet metal foil mounted adjacent said roll in advance of said first named location and extending with its forward edge at least partly beneath said shoe and arranged to guide said web onto said roll.

10. A device as claimed in claim 9 in which said forward edge is located approximately at the line of intersection of said pressing portions of said shoe and the outer surface of said roll.

11. A device as claimed in claim 9 in which said forward edge is located substantially at the discharge edge of said shoe.

12. A device for condensing in the direction of its length a traveling web comprising in combination a driven roll composed of deformable material, said roll having an uninterrupted frictional web-gripping surface, mechanism for feeding said web onto said roll at one location thereon, a shoe arranged to press said web against said surface as it is carried forward by the latter, the web-engaging portion of said shoe being smooth and presenting relatively slight frictional resistance to the passage of said web, and a take-off comb arranged in closely spaced relation to the discharge edge of said shoe, mounting means mounting said comb in its said relation, said comb having teeth engaging and inwardly deforming the surface of said roll at said discharge area so as to reach beneath and lift said web from said roll and simultaneously condense the same in the direction of its length.

13. A device as claimed in claim 12 wherein said mounting means are adjustable, permitting adjustment of said comb toward and away from said roll.

14. A device as claimed in claim 13 wherein said mounting means include mechanism for varying the angle of incidence between the teeth of said comb and the surface of said roll.

15. A device as claimed in claim 13 wherein said mountings include mechanism for adjusting the distance between the discharge edge of said shoe and the teeth of said comb in a direction circumferential of said roll.

16. A device for widthwise and lengthwise condensing of a traveling web comprising a supporting frame, means for mounting a stock roll of web on said frame, a curved roll mounted on said frame in spaced relation to said feed roll, said roll being convex on one side and concave on the other side thereof, means for guiding said web onto the convex side of said roll and substantially 180° thereabout, intermeshing roller means mounted on said frame leading said web from said concave side, and a driven roll mounted on said frame at the discharge side of said intermeshing rolls, said intermeshing rolls being adapted to feed said web onto said driven roll at one location thereon, said driven roll being provided with alternate circumferential ribs and grooves, said ribs having frictional web-gripping surfaces, means to press said web into said grooves on said driven roll as it is carried forward by the latter, the web-engaging portion of said pressing means being smooth and presenting relatively slight frictional resistance to the passage of said web and a rotatable take-off comb mounted so as to interesect said roll and extend into said grooves at a location in closely spaced relation to the discharge edge of said shoe to lift said web from said roll and simultaneously alter the degree of condensation of the same in the direction of its length.

17. A device for longitudinally and transversely condensing a traveling web which comprises a smooth curved bar, a pair of mutually spaced parallel bent axles mounted with their convex portions facing the concave portion of said first-named bar, said bar and said axles lying in parallel planes and having their centers of curvature on a line perpendicular to said planes, a series of interfitting rollers freely rotatable on each of said axles, the rollers of one of said series intermeshing with rollers of the other series, guiding means for directing said web around the convex portion of said bar and drawing means for drawing the same from said bar through said intermeshing rollers and at least partly around the rollers of one of said series on the concave side thereof, said drawing means comprising a driven roll provided with alternating circumferential ribs and grooves, said ribs having frictional web-gripping surfaces, mechanism for directing said web onto said roll at one location thereon, mechanical pressing means arranged to press said web into said grooves on said roll as it is carried forward by the latter, the web-engaging portion of said pressing means being smooth and presenting relatively slight frictional resistance to the passage of said web, and a take-off comb mounted so as to intersect said roll and extend into said grooves at a location in closely spaced relation to the discharge edge of said pressing means to lift said web from said roll and simultaneously condense the same in the direction of its length.

18. A creping roll which comprises a shaft having relatively shallow alternating circumferential peripheral ridges and grooves, snap rings locked in said grooves, and apertured discs of greater diameter than said rings alternating with the latter and fitting on said ridges, said discs being locked against movement in an axial direction by said rings.

19. A creping roll as defined in claim 18 in which the peripheral surfaces of said discs are provided with web-gripping serrations.

References Cited in the file of this patent

UNITED STATES PATENTS

| | | |
|---|---|---|
| 739,276 | Allen | Sept. 22, 1903 |
| 1,627,966 | Goodlett | May 10, 1927 |
| 1,667,292 | Lorenz | Apr. 24, 1928 |
| 2,141,433 | Haas | Dec. 27, 1938 |
| 2,494,723 | Rowe | Jan. 17, 1950 |
| 2,635,065 | Nashley | Apr. 14, 1953 |
| 2,761,490 | Walton | Sept. 4, 1956 |
| 2,814,332 | Molla | Nov. 26, 1957 |